(12) United States Patent
Christ et al.

(10) Patent No.: US 8,189,440 B2
(45) Date of Patent: May 29, 2012

(54) METHOD AND APPARATUS FOR VIBRATION DAMPING OF A SUSPENDED MEDIA READ/WRITE HEAD

(75) Inventors: James R. Christ, Peachtree City, GA (US); Michael P. Colalillo, Peachtree City, GA (US); Dallas D. Hickerson, Sharpsburg, GA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 778 days.

(21) Appl. No.: 12/012,585

(22) Filed: Feb. 4, 2008

(65) Prior Publication Data

US 2009/0195908 A1    Aug. 6, 2009

(51) Int. Cl.
*G11B 7/00* (2006.01)
(52) U.S. Cl. .................................... 369/53.12
(58) Field of Classification Search .......... None
See application file for complete search history.

(56) References Cited

U.S. PATENT DOCUMENTS

| | | | |
|---|---|---|---|
| 5,426,545 A | | 6/1995 | Sidman et al. |
| 6,141,305 A | * | 10/2000 | Tsutsui ............... 369/44.32 |
| 7,035,034 B2 | * | 4/2006 | Semba et al. ............. 360/75 |
| 7,082,009 B2 | * | 7/2006 | Zayas et al. ............ 360/78.04 |
| 7,265,929 B2 | * | 9/2007 | Umeda et al. .............. 360/75 |
| 2002/0075772 A1 | * | 6/2002 | Cheong et al. ........ 369/44.16 |
| 2003/0218819 A1 | * | 11/2003 | Sri-Jayantha et al. ...... 360/75 |
| 2004/0213100 A1 | * | 10/2004 | Iwashiro ............... 369/44.32 |
| 2006/0012912 A1 | | 1/2006 | Jeong |
| 2006/0077587 A1 | | 4/2006 | Kisaka et al. |
| 2006/0152842 A1 | | 7/2006 | Pasolini et al. |
| 2007/0030768 A1 | | 2/2007 | Semba et al. |
| 2007/0291399 A1 | * | 12/2007 | Kamimura et al. ......... 360/75 |

* cited by examiner

*Primary Examiner* — Peter Vincent Agustin
*Assistant Examiner* — Emily Frank
(74) *Attorney, Agent, or Firm* — Laurence S. Roach

(57) ABSTRACT

A method of controlling a head for a recording medium includes determining that the head is in an inoperative state, and activating a damping arrangement in response to the determination that the head is inoperative. A movement of the head while the head is inoperative is sensed. The damping arrangement is used in response to the sensing step to exert a force upon the head to thereby damp the movement, a magnitude of the force being dependent upon a parameter of the movement.

20 Claims, 7 Drawing Sheets

US 8,189,440 B2

1

METHOD AND APPARATUS FOR VIBRATION DAMPING OF A SUSPENDED MEDIA READ/WRITE HEAD

BACKGROUND OF THE INVENTION

1. Field of the Invention

The present invention relates to a method of damping vibration in a read/write head during time periods in which the head is inoperative.

2. Description of the Related Art

In a disk drive, a device known as a "head" is used to read or write to an optical recording medium such as a compact disk (CD). A head that can read and/or write to an optical recording medium may be referred to herein as a "read/write head." If the compact disk is configured such that it cannot be written to, but can only be read, it is sometimes referred to as a "CD-ROM".

A laser diode of the head reads and/or writes to the optical recording medium by focusing energy upon particular locations on the optical recording medium. During time periods in which the head is operating, i.e., is reading and/or writing to the optical recording medium, the head is constantly actuated in directions toward and away from the optical recording medium in order to keep the laser diode focused. The head may include at least one permanent magnet, and the head may be actuated by exerting an electromagnetic field on the head by running an electrical current through a coil that is adjacent to the head.

During time periods in which the head is not operating, there is no need to focus the head on the optical recording medium. Thus, in known disk drives, no actuation or control of the position of the read/write head occurs while the head is not operating.

Accordingly, what is neither anticipated nor obvious in view of the prior art is any method of controlling the position of a read/write head during time periods in which the head is not reading or writing to an optical recording medium.

SUMMARY OF THE INVENTION

The present invention provides a method of sensing movement of a read/write head of a disk drive during time periods in which the read/write head is not operating, and then exerting a counteracting force on the head in order to reduce the movement of the head. In one embodiment, a same coil that is used to actuate the head while the head is operating is also used to actuate the head while the head is not operating. In a particular embodiment, current induced through, and/or voltage induced across, the coil by the magnet in the moving head is sensed and is used in creating a counteracting current through, and/or voltage across, the coil. The counteracting current and/or voltage results in a counteracting electromagnetic force being exerted on the head, thereby reducing the magnitude and/or speed of the movement of the head.

The present invention may be particularly applicable to a read/write head whose position is adjusted to focus the head on a recording medium by exerting a magnetic field on the head. The magnetic field may be created by running an electrical current through, and/or creating a voltage across, an adjacent coil. The head may be attached to a permanent magnet that is subject to the magnetic field. When the head is subject to vibration or undesirable movement while the head is inoperative, the accompanying movement of the magnet may create a magnetic field by which the movement of the head may be sensed. Particularly, the movement of the magnet may create a magnetic field that induces current through,

2 and/or voltage across, the coil. The coil current and/or voltage may be sensed in order to detect movement of the head.

In one embodiment of the invention, a method of controlling a head for a recording medium comprises determining that the head is in an inoperative state, and activating a damping arrangement in response to the determination that the head is inoperative. A movement of the head while the head is inoperative is sensed. The damping arrangement is used in response to the sensing step to exert a force upon the head to thereby damp the movement, a magnitude of the force being dependent upon a parameter of the movement.

In another embodiment of the invention, a method of controlling a head for a disk drive comprises determining that the head is in an inoperative state. A movement of the head while the head is inoperative and/or a force exerted on the head while the head is inoperative is sensed. A damping electromagnetic force is exerted upon the head in response to the sensing step.

In yet another embodiment of the invention, a disk drive comprises a sensor for sensing a movement of the head and/or a force exerted on the head. A damping apparatus is coupled to the sensor and exerts a damping force on the head in response to a signal from the sensor. A controller is coupled to the sensor and/or the damping apparatus. The controller deactivates the sensor and/or the damping apparatus when the head is in an operative state.

An advantage of the present invention is that vibration of the read/write head can be minimized during time period in which play-back is not occurring.

Another advantage is that the same coil that is used to actuate the head during play-back may be used to both sense movement of the head and actuate the head when play-back is not occurring.

Yet another advantage is that if the head is subject to an oscillatory shock while it is not operating, the present invention may damp movement of the head before it reaches the peak position associated with an initial spike.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
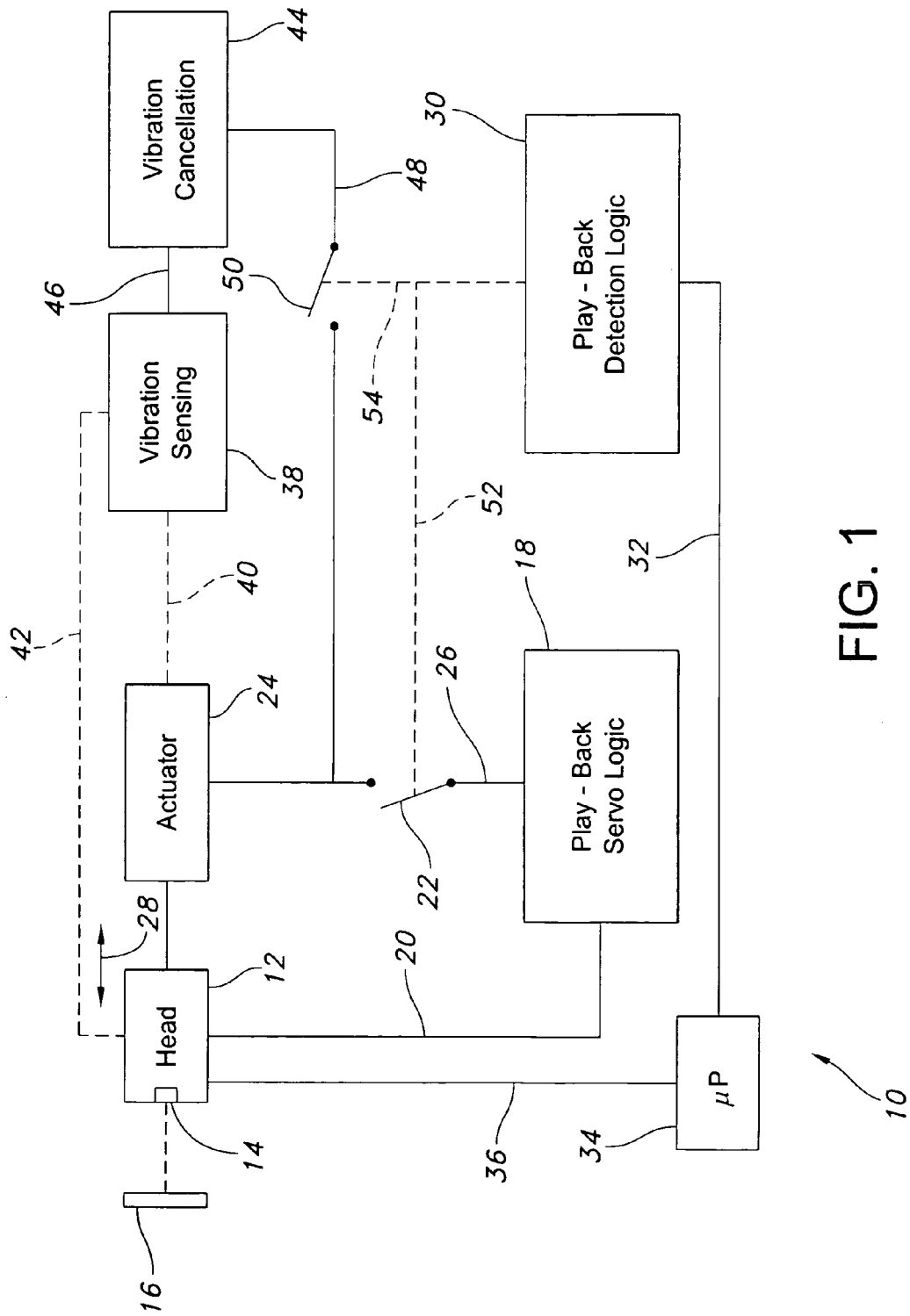
FIG. 1 is a block diagram of one embodiment of a disk drive arrangement of the present invention.

Turning now to the drawings, and particularly to FIG. 1, there is shown one embodiment of a disk drive 10 of the present invention including a damping apparatus for active vibration damping of a read/write head 12. Head 12 may have a laser diode 14 for reading and/or writing to an optical recording medium 16. In the specific embodiments shown herein, head 12 reads medium 16 for play-back purposes. However, it is to be understood that the present invention is not limited to a read head. For example, the invention may be applied to a head that writes to a recording medium but does not read the medium. In one embodiment, medium 16 is a compact disk (CD) or CD-ROM.

Play-back servo logic 18 may maintain laser diode 14 of head 12 properly focused on medium 16. Servo logic 18 may receive information indicative of whether diode 14 is properly focused, or may otherwise determine whether diode 14 is properly focused, via a link 20. When switch 22 is in a closed position, as described in more detail below, servo logic 18 may transmit control signals to an actuator 24 via line 26. In response to the control of servo logic 18, actuator 24 may move head 12 in directions 28 toward and away from medium 16 to thereby better focus diode 14 on medium 16.

A controller in the form of play-back detection logic 30 may determine whether head 12 is currently operating to read medium 16, i.e., whether disk drive 10 is in a play-back mode of operation. Detection logic 30 may receive information indicative of whether head 12 is currently operating, or may otherwise determine whether head 12 is currently operating, via a link 32 to a controller 34. Controller 34 may receive read data from head 12 via a link 36, and controller 34 may control head 12 via link 36.

A vibration sensing device 38 may receive a signal from actuator 24 via link 40. The signal received via link 40 may be indicative of the existence, speed or magnitude of movement and/or vibration of head 12. In an alternative embodiment, vibration sensing device 38 directly senses the existence, speed or magnitude of movement and/or vibration of head 12 via a link 42. Link 42 may not be provided if link 40 is present, and, conversely, link 40 may not be provided if link 42 is present.

A damping apparatus may include a vibration cancellation device 44 and a switch device for activating or deactivating vibration sensing device 38 and/or vibration cancellation device 44. Vibration cancellation device 44 may receive a signal from vibration sensing device 38 via a link 46. Like the signal on link 40, the signal on link 46 may be indicative of the existence, speed or magnitude of movement and/or vibration of head 12. However, vibration sensing 38 may condition and/or process the signal on link 40 such that the signal on link 46 better or more clearly identifies or specifies the existence, speed or magnitude of movement and/or vibration of head 12. Vibration cancellation device 44 may use or process the signal on link 46 to produce a signal on 48. When applied to actuator 24, the signal on link 48 may cause actuator 24 to actuate head 12 in such a manner as to reduce or at least partially cancel out the vibration sensed by vibration sensing device 38.

In one embodiment, the signals on links 46 and 48 are oscillatory. For example, the signals on links 46 and 48 may be sinusoidal. The signal on link 48 may be about 180 degrees out of phase with the signal on link 46 to thereby cause actuator 24 to exert a force on head 12 that reduces or at least partially cancels out the vibration of head 12 when the signal on link 48 is applied to actuator 24.

Play-back detection logic 30 is operative to open and close switches 22 and 50, as indicated at 52 and 54 respectively. More particularly, detection logic 30 may maintain switch 22 in a closed position and switch 50 in an open position when detection logic 30 determines that play-back is occurring. Conversely, detection logic 30 may maintain switch 22 in an open position and switch 50 in a closed position when detection logic 30 determines that play-back is not occurring. Thus, when play-back is occurring, play-back servo logic 18 transmits signals to actuator 24 via switch 22 in order to control the position of head 12. Conversely, when play-back is not occurring, play-back detection logic 30 transmits signals to actuator 24 via switch 50 in order to control the position of head 12. Thus, logic 30 may increase or decrease the impedance of the damping arrangement in order to deactivate or activate the damping arrangement, respectively.

Figure 2:
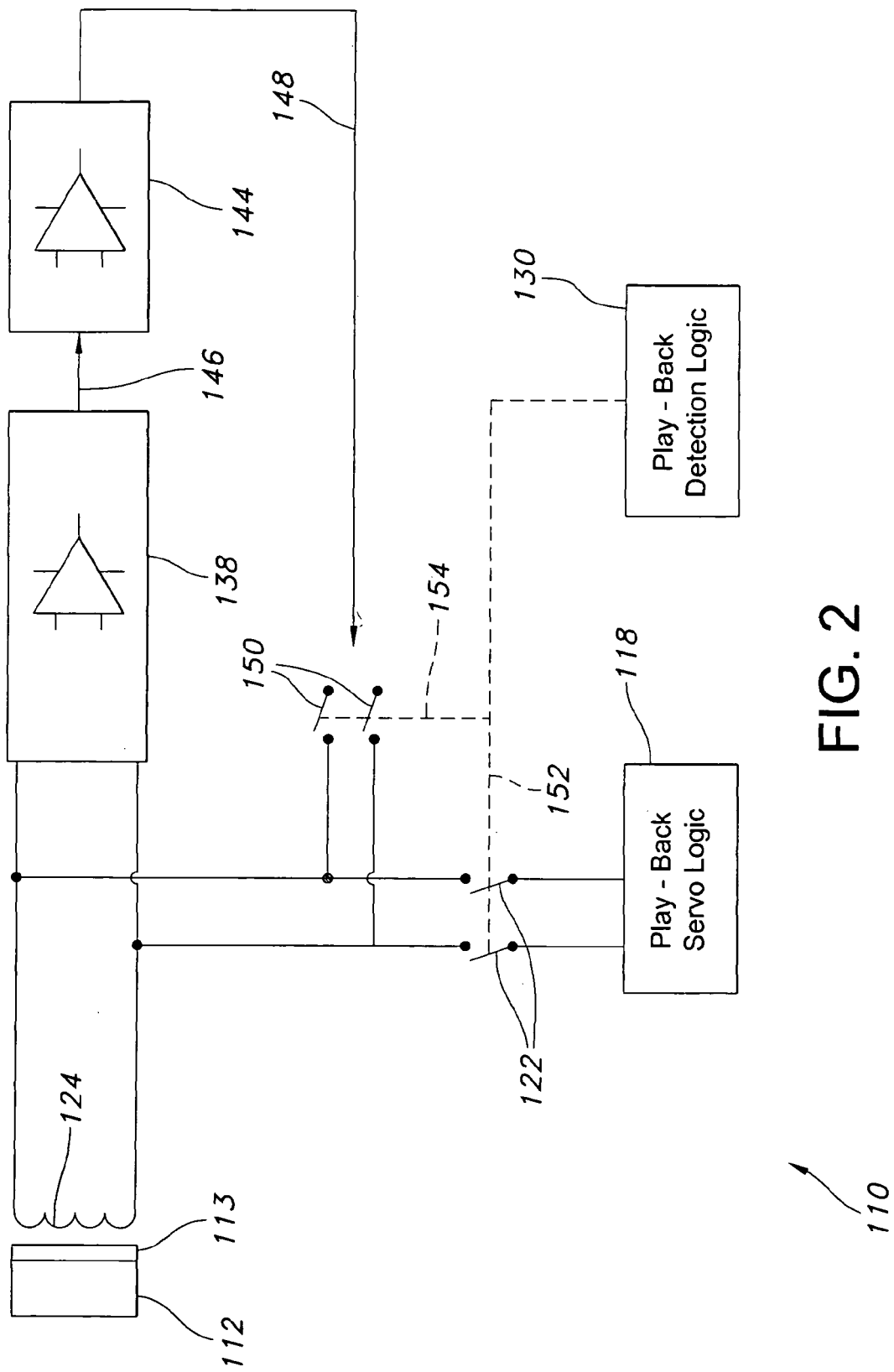
FIG. 2 is a block diagram of a more specific embodiment of the disk drive arrangement of FIG. 1.

In the specific embodiment of a disk drive 110 shown in FIG. 2, a head 112 includes a permanent magnet 113 attached thereto. An active vibration damping circuit includes an actuator in the form of an inductive coil 124. Thus, when head 112 and magnet 113 move, a moving magnetic field is created thereby which induces an electrical current through, and/or a voltage across, coil 124.

A vibration sensing device is in the form of an error amplifier 138 having inputs connected to the respective opposite ends of coil 124. Thus, error amplifier 138 monitors a voltage across coil 124. Coil 124 and error amplifier 138 (and likewise actuator 24 and vibration sensing 38) may conjunctively form an electromagnetic sensor. An output 146 of amplifier 138 is transmitted to a vibration cancellation device in the form of a lead-lag filter 144. Filter 144 may function as a phase matching circuit that produces an output in the form of error canceling feedback on a line 148. In one embodiment, the output on line 148 is about 180 degrees out of phase with the signal on output 146. One particular hardware embodiment of lead-lag filter 144 is an operational amplifier incorporating a feedback loop and having a resistor connected to one input and a capacitor connected to the other input.

Play-back detection logic 130 is operative to open and close switches 122 and 150 as indicated at 152 and 154, respectively. When play-back detection logic 130 determines, in a manner similar to that of logic 30 of FIG. 1, that play-back is not occurring, logic 130 may maintain switches 122 in an open position and switches 150 in a closed position.

When switches 150 are closed, and switches 122 are open, the error canceling feedback on line 148 is applied to coil 124, thereby causing a voltage across, and a current flow through, coil 124. This current through coil 124 creates a magnetic field that applies an electromagnetically-induced damping force on magnet 113 and, consequently, on head 112. Thus, coil 124 may be used to both sense the movement of head 112 and induce movements of head 112 by applying force thereto.

Conversely, when play-back detection logic 130 determines that play-back is occurring, logic 130 may maintain switches 122 in a closed position and switches 150 in an open position. When switches 122 are closed, and switches 150 are open, play-back servo logic 118 applies signals to coil 124, thereby causing a voltage across, and a current flow through, coil 124. This current through coil 124 creates a magnetic field that applies an electromagnetic force on magnet 113 and, consequently, on head 112. Similarly to servo logic 18 of FIG. 1, servo logic 118 may receive information regarding the focusing of head 112 on a recording medium (not shown). Servo logic 118 may apply voltage and/or current to coil 124 such that the focus of head 112 on the recording medium is improved.

Figure 3:
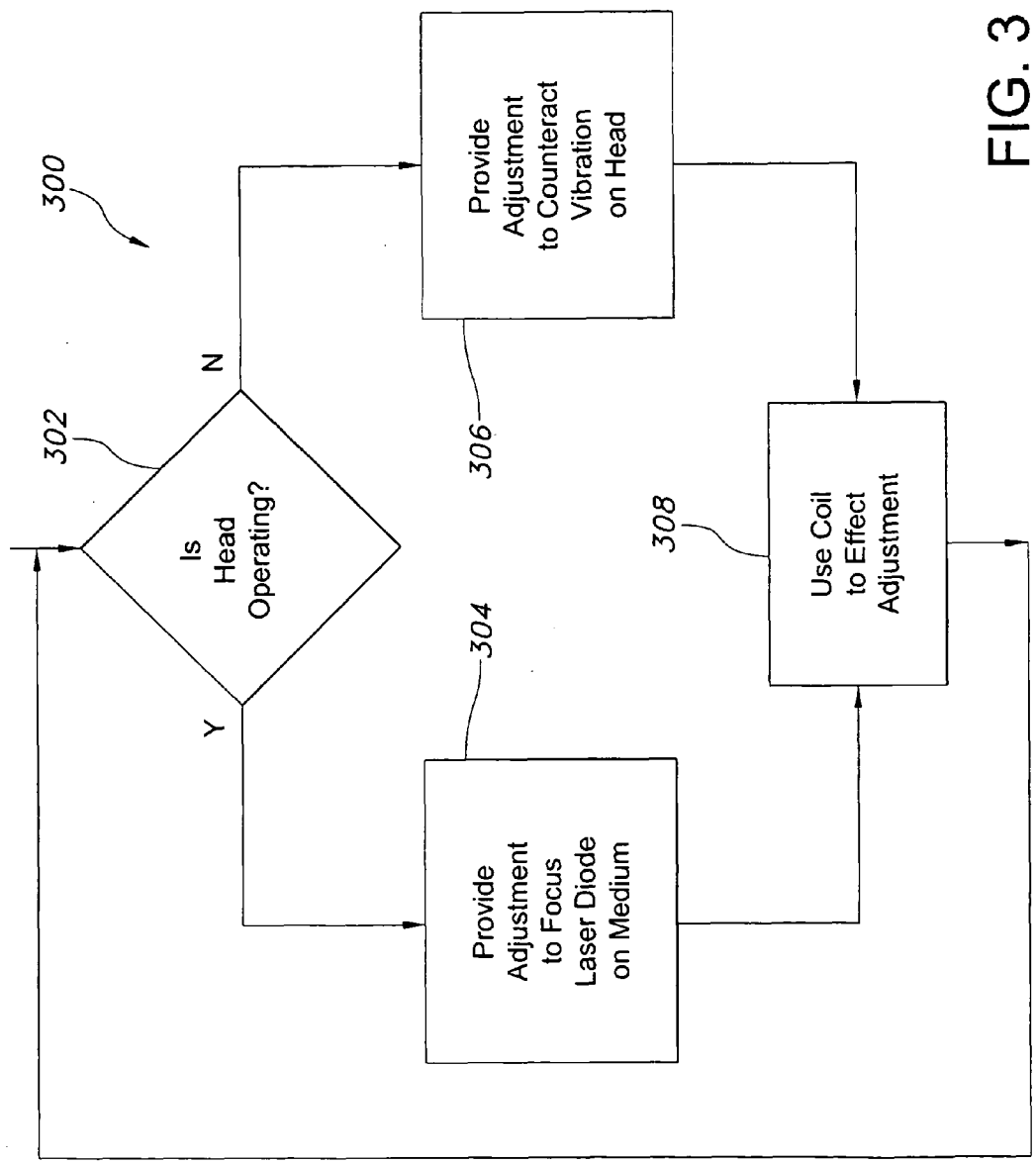
FIG. 3 is a flow chart of one embodiment of a method of the present invention for controlling a head for a recording medium.

FIG. 3 is a flow chart illustrating one embodiment of a method 300 of the present invention for controlling a head for a recording medium. In a first step 302, it is determined whether a read/write head of a disk drive is operating. For example, play-back detection logic 30 may determine whether head 12 is reading a recording medium. Alternatively, or in addition, it may be determined whether a head is currently writing to a recording medium. If it is determined in step 302 that the head is operating, then operation proceeds to step 304 where an adjustment that is needed to better focus a laser diode 14 of head 12 on recording medium 16 is provided. Such an adjustment may be made by play-back servo logic 18, for example. Conversely, if it is determined in step 302 that the head is not operating, then operation proceeds to step 306 where an adjustment that is needed to counteract vibration in head 12 is provided. For example, a coil 124 may sense the movement of head 112 and produce a signal indicative of the movement, error amplifier 138 may amplify the signal, and lead-lag filter 144 may provide a signal to coil 124 to actuate head 112 in a manner that counteracts the movement. Regardless of whether or not the head is operating in a play-back mode, in step 308, coil 124 may be used to effect an adjustment of the position of head 124. If play-back is occurring, servo logic 118 may apply appropriate voltages to coil 124. Conversely, if play-back is not occurring, lead-lag filter 144 may apply appropriate voltages to coil 124. After the coil has been used to effect adjustment of the head, operation returns to step 302 to determine whether the head is currently operating to read and/or write to the recording medium.

Figure 4:
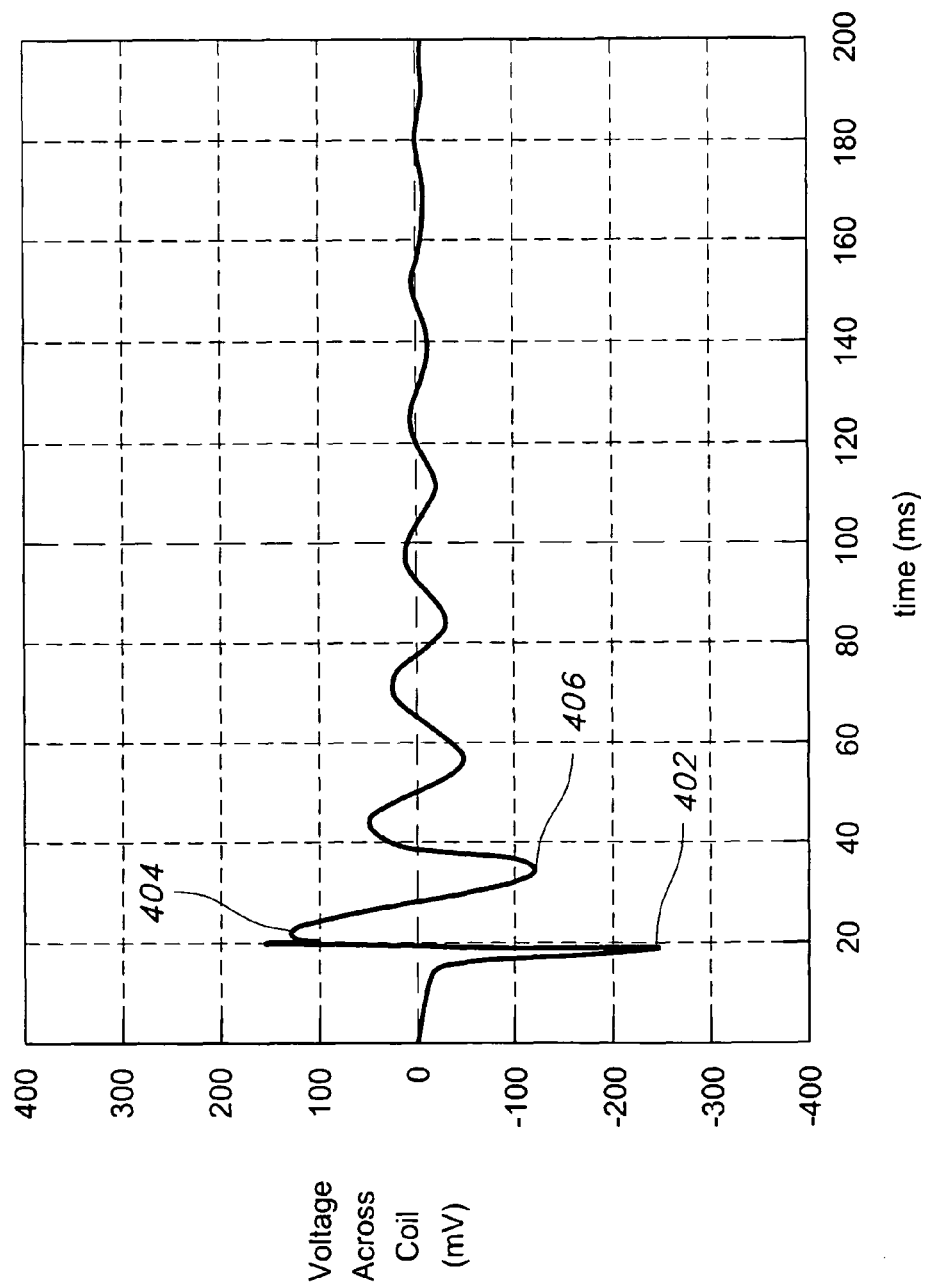
FIG. 4 is an exemplary plot of voltage across the coil of FIG. 2 versus time if the head of FIG. 2 were to undergo a shock without the damping effects of the present invention.

FIG. 4 is an exemplary plot of voltage across coil 124 of FIG. 2 versus time in the event that head 112 undergoes a mechanical shock without the benefit of the damping effects of the present invention. For example, the disk drive may be in the form of a compact disc player installed in an automobile. The mechanical shock to the head may be a result of the vehicle hitting a pothole, for instance. As can be seen in FIG. 4, an initial spike begins at an arbitrary time of about 16 milliseconds, reaches an initial local peak 402 at about 18 milliseconds, and the initial spike is completed at about 20 milliseconds. Thus, the initial spike may take some period of time on the order of 2 milliseconds (18 milliseconds–16 milliseconds) to reach an initial local peak 402. As the head and, consequently, the voltage across the coil continue to oscillate, other local peaks 404, 406, etc., may be reached.

In one embodiment, the present invention is capable of damping a mechanical shock such as illustrated in FIG. 4 such that what is left of the oscillation is not even perceptible to the human eye when plotted on the scale of FIG. 4. More particularly, the damping provided by the present invention may begin to take effect within a few microseconds after the initial spike begins. Thus, in one embodiment, the damping response may begin to cancel out the spike in about one-thousandth (microseconds versus milliseconds) of the time period required for the initial spike to reach an initial local peak.

Figure 5:
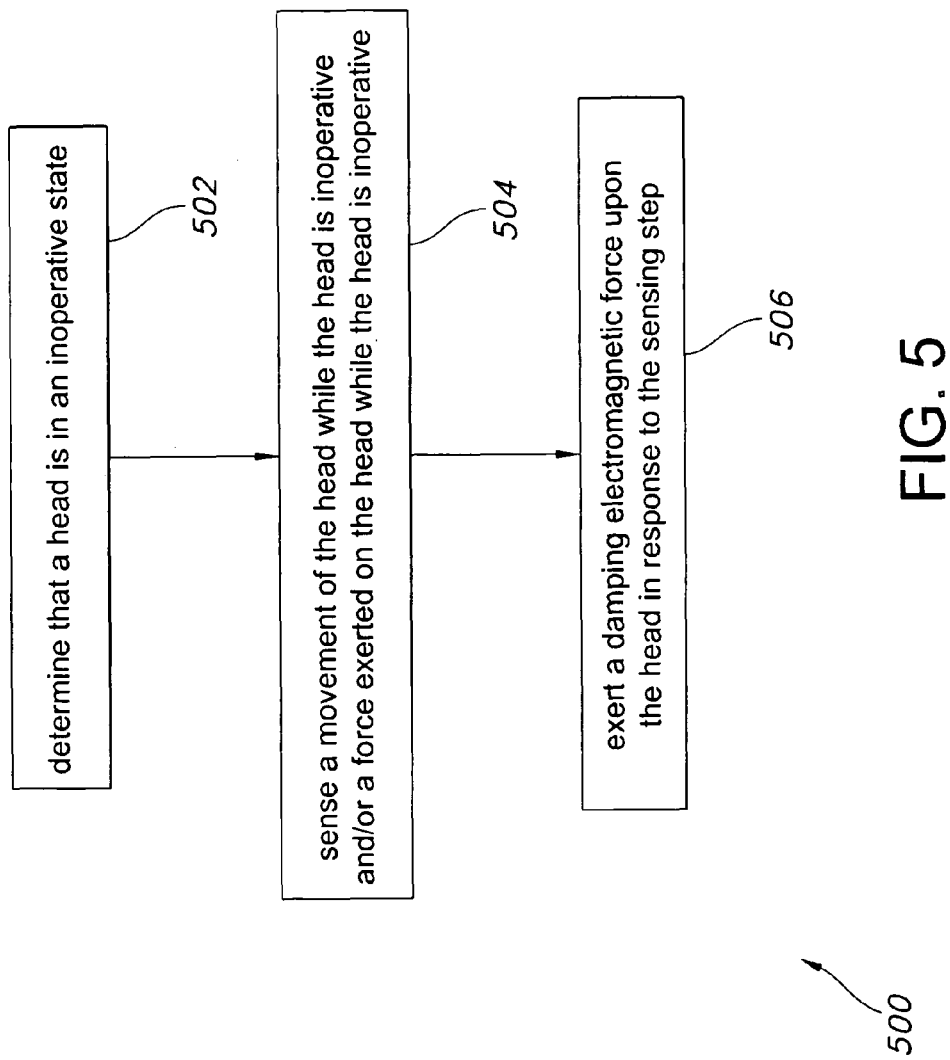
FIG. 5 is a flow chart of another embodiment of a method of the present invention for controlling a head for a recording medium.

One embodiment of a method 500 of the present invention for controlling a head for a disk drive is illustrated in FIG. 5. In a first step 502, it is determined that the head is in an inoperative state. For example, play-back detection logic 30 may determine, based upon signals from controller 34, whether or not head 12 is actively reading and/or writing to recording medium 16. In a next step 504, a movement of the head while the head is inoperative is sensed. In one embodiment, after play-back detection logic 130 determines that head 112 is not reading or writing, error amplifier 138 senses movement of head 112 by virtue of sensing voltage across coil 124. Alternatively, as discussed below with regard to the embodiment of FIG. 7, a force exerted on the head while the head is inoperative (rather than a movement of the head while the head is inoperative) is sensed by an active vibration damping circuit. Next, in step 506, a damping electromagnetic force is exerted upon the head in response to the sensing of the head while the head is inoperative. For example, after error amplifier 138 senses movement of head 112, a signal 146 is transmitted by error amplifier 138 to lead-lag filter 144. In response to receiving signal 146, lead-lag filter 144 may apply a voltage to coil 124. The resulting current through coil 124 may create an electromagnetic field that exerts a damping electromagnetic force on magnet 113 and, consequently, on the head that is attached to magnet 113.

Figure 6:
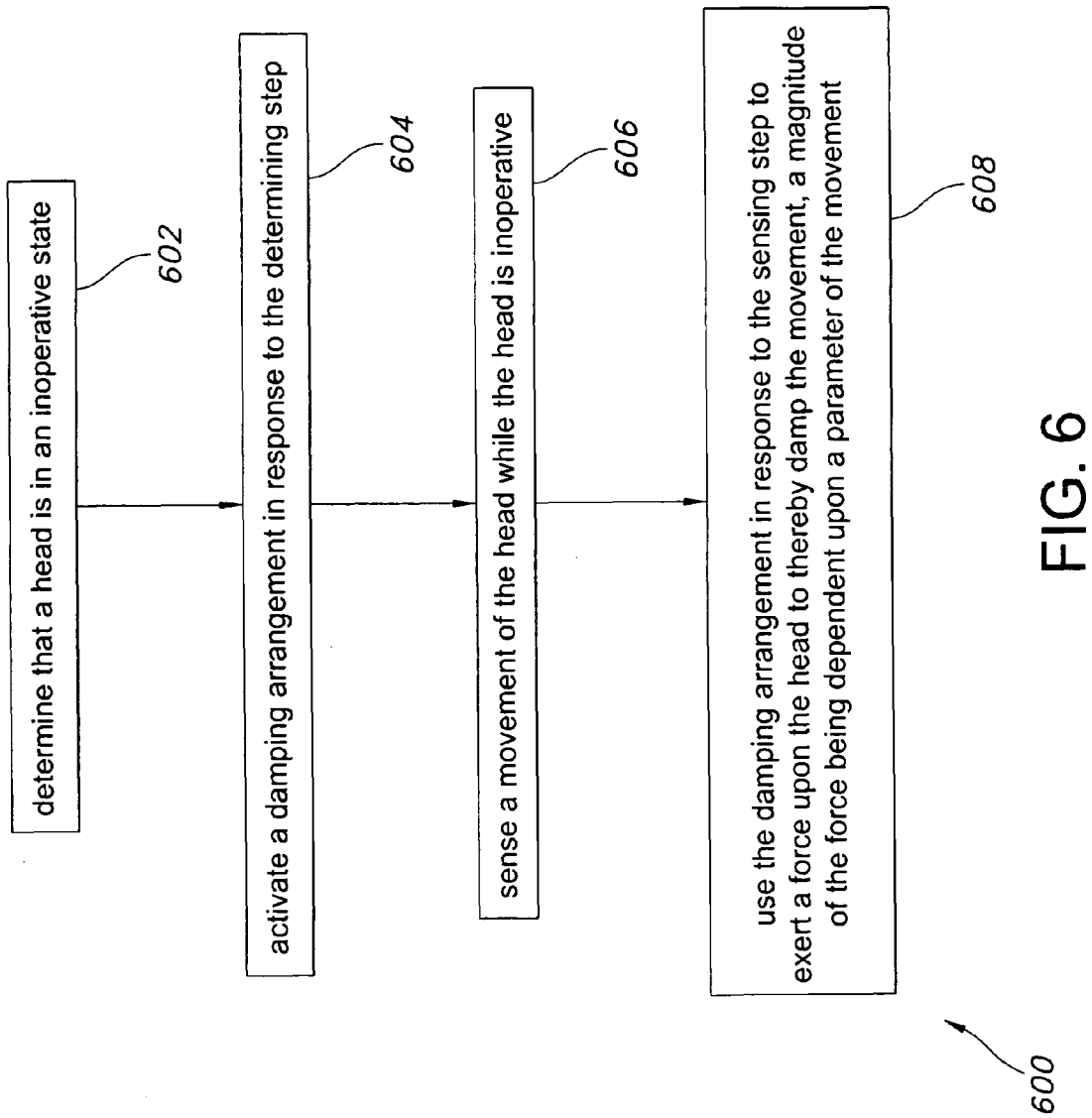
FIG. 6 is a flow chart of yet another embodiment of a method of the present invention for controlling a head for a recording medium.

One embodiment of a method 600 of the present invention for controlling a head for a recording medium is illustrated in FIG. 6. In a first step 602, it is determined that the head is in an inoperative state. For example, play-back detection logic 130 may determine whether or not head 112 is actively reading and/or writing to a recording medium. Logic 130 may detect an absence of playback of the recording medium. In one embodiment, logic 130 may sense that the spindle motor is not drawing current, and thus may determine that head 112 is in an inoperative state. In a next step 604, a damping arrangement is activated in response to the determination that the head is in an inoperative state. Specifically, after determining that head 112 is in an inoperative state, detection logic 130 may maintain switches 122 in an open state and switches 150 in a closed state. When switches 150 are closed, a damping arrangement including error amplifier 138 and lead-lag filter 144 may be activated. Next, in step 606, a movement of the head while the head is inoperative is sensed. In one embodiment, error amplifier 138 senses movement of head 112 by virtue of sensing voltage across coil 124. Alternatively, as discussed below with regard to the embodiment of FIG. 7, a force exerted on the head while the head is inoperative is sensed by an active vibration damping circuit. In step 608, in response to sensing movement of the head, the damping arrangement is used to exert a force upon the head to thereby damp the movement, a magnitude of the force being dependent upon a parameter of the movement. For example, after error amplifier 138 senses movement of head 112, a signal 146 is transmitted by error amplifier 138 to lead-lag filter 144. In response to receiving signal 146, lead-lag filter 144 may apply a voltage to coil 124. The resulting current through coil 124 may create an electromagnetic field that exerts a damping electromagnetic force on magnet 113 and, consequently, on the head that is attached to magnet 113.

A magnitude of the signal on line 148 may be dependent upon a parameter of the movement. In one embodiment, the parameter is in the form of the speed of the movement of head 112. The greater the speed of the movement, the greater the magnitude of the voltage that is applied to error amplifier 138 by coil 124. In turn, the greater the magnitude of the voltage that is applied to error amplifier 138, the greater the amplified signal 146, and the greater the signal applied to coil 124 on line 148. Further, the greater the signal applied to coil 124, the greater the electromagnetic field created by the current flowing through the coil, and the greater the force exerted on head 112. Thus, the magnitude of the damping force exerted upon head 112 may be dependent upon the speed of the head that was initially measured.

For simplification of illustration, damping currents through coil 124 and damping electromagnetic fields created thereby are generally described herein in isolation from the initial electromagnetic fields and the initial currents that are induced in coil 124 that are caused by the initial movements of the head. However, it is to be understood that the vibration damping circuit of the present invention may function to cancel out the initial electromagnetic fields and initial currents induced in coil 124 by the movements of the head. Conversely, the electromagnetic fields and the currents that are induced in coil 124 by the vibration damping circuit may be canceled out by the initial electromagnetic fields and initial currents induced in coil 124 by the movements of the head.

Figure 7:
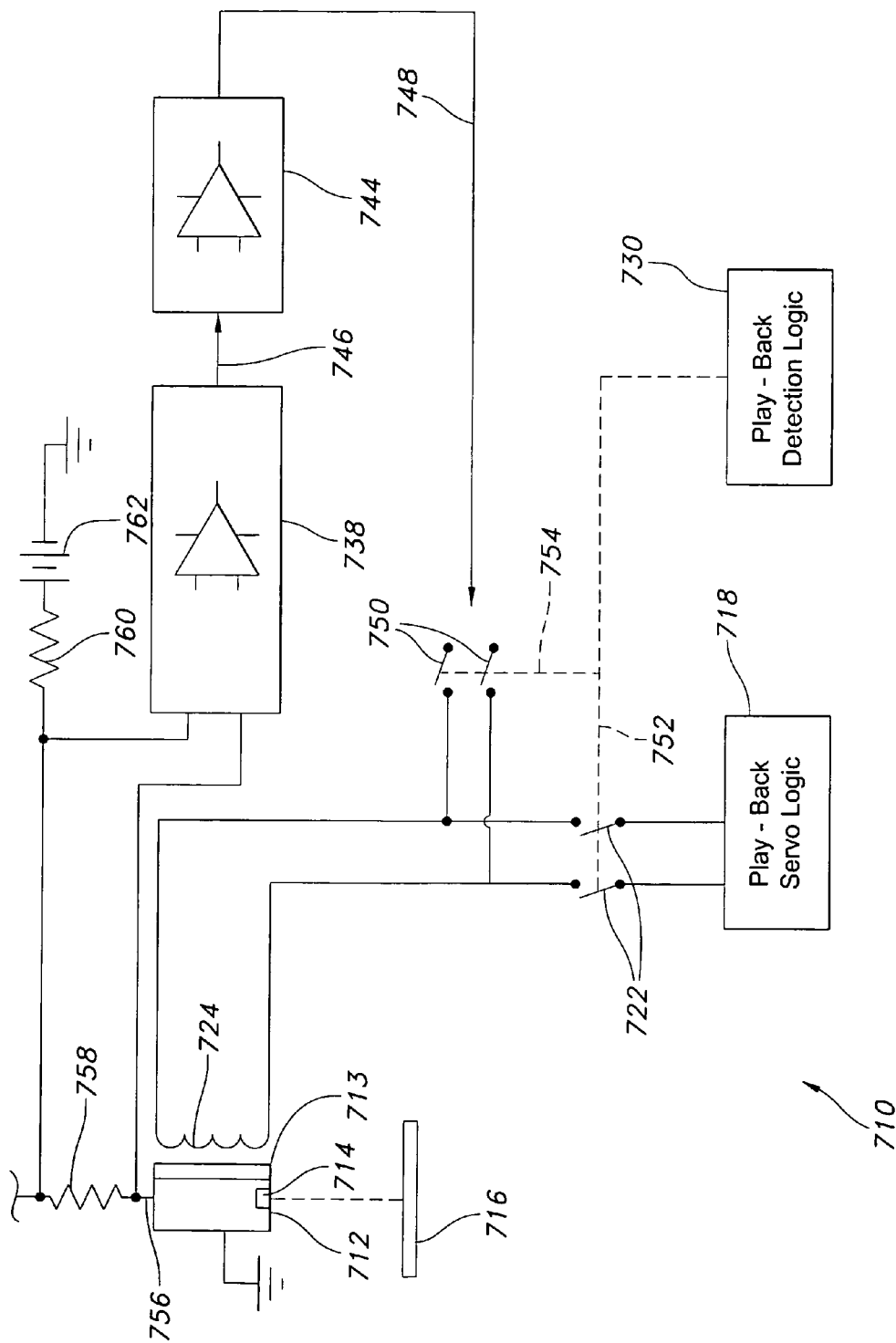
FIG. 7 is a block diagram of another embodiment of a disk drive arrangement of the present invention.

In an alternative embodiment of a disk drive 710 shown in FIG. 7, a head 712 includes a permanent magnet 713 attached thereto. Head 712 is suspended by one or more suspension wires, and one such wire 756 is shown in FIG. 7. An active vibration damping circuit includes a semiconductor strain gauge or piezoresistor 758 attached to wire 756. If head 712 is subject to any movement, the resistance of piezoresistor 758 may change accordingly. Thus, piezoresistor 758 may sense the movement of head 712 and the resultant stretching of wire 756. In one embodiment, piezoresistor 758 is part of a voltage divider including a resistor 760 and a voltage source 762. As the resistance of piezoresistor 758 changes as head 712 moves, the voltage applied to the inputs of error amplifier 738 changes accordingly. Hence, any vibration or shock to which head 712 is subjected is sensed.

An output 746 of amplifier 738 is transmitted to a vibration cancellation device in the form of a lead-lag filter 744. Filter 744 may function as a phase matching circuit that produces an output in the form of error canceling feedback on a line 748. In one embodiment, the output on line 748 is about 180 degrees out of phase with the signal on output 746. One particular hardware embodiment of lead-lag filter 744 is an operational amplifier incorporating a feedback loop and having a resistor connected to one input and a capacitor connected to the other input.

Play-back detection logic 730 is operative to open and close switches 722 and 750 as indicated at 752 and 754, respectively. When play-back detection logic 730 determines, in a manner similar to that of logic 30 of FIG. 1, that play-back is not occurring, logic 730 may maintain switches 722 in an open position and switches 750 in a closed position.

When switches 750 are closed, and switches 722 are open, the error canceling feedback on line 748 is applied to coil 724, thereby causing a voltage across, and/or current flow through, coil 724. This current through coil 724 creates a magnetic field that applies an electromagnetic force on magnet 713 and, consequently, on head 712. Thus, coil 724 may be used to induce movements of head 712 by applying force thereto.

Conversely, when play-back detection logic 730 determines that play-back is occurring, logic 730 may maintain switches 722 in a closed position and switches 750 in an open position. When switches 722 are closed, and switches 750 are open, play-back servo logic 718 applies signals to coil 724, thereby causing a voltage across, and/or current flow through, coil 724. This current through coil 724 creates a magnetic field that applies an electromagnetic force on magnet 713 and, consequently, on head 712. Similarly to servo logic 18 of FIG. 1, servo logic 718 may receive information regarding the focusing of head 712 on a recording medium 716. Servo logic 718 may apply voltage across, and/or current to, coil 724 such that the focus of laser diode 714 of head 712 on recording medium 716 is improved.

Controller 34 has been described herein as specifying to detection logic 30 when play-back occurs. In another embodiment (not shown), a separate circuit automatically detects the mechanical or electrical phenomena or events that characterize optical media playback. For example, the circuit could detect current drawn by the spindle motor from the power supply. The circuit could control switches 22, 50.

The play-back detection logic of the present invention has been illustrated herein as opening and closing switches in order to enable or disable the active vibration damping circuit. However, it is to be understood that there are other ways within the scope of the invention for the play-back detection logic to enable or disable the active vibration damping circuit. For example, the detection logic could accomplish the switching via electromechanical relays or electronic switch devices. The impedance of the damping arrangement may be changed via use of an electronic switch device in order to activate or deactivate the damping arrangement. As another alternative, the error amplifier and lead-lag filter could be designed to exhibit a low impedance (vibration damping selected/active) characteristic or high impedance (vibration damping deselected/inactive) characteristic to the normal playback tracking circuit as needed.

Switches 50, 150 are shown herein as being disposed in lines 48, 148. However, it is to be understood that the switches may alternatively be disposed before or immediately after the vibration sensing. For example, switch 50 may be disposed in any one of links 40, 42 and 46. Moreover, switches 150 may be disposed at the inputs to error amplifier 138 or between error amplifier 138 and lead-lag filter 144. Thus, switches 50, 150 may be used to activate and deactivate both vibration sensing and vibration cancellation.

The present invention has been described herein as applying mainly to a read/write head that is installed in a vehicle, such as an automobile. However, it is to be understood that the invention also applies to any other type or installation of a read/write head wherein the head is not typically subjected to vibration, such as an installation in a residential or office environment.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of controlling a head for a recording medium, comprising the steps of:
   determining that the head is in an inoperative state;
   activating a damping arrangement in response to the determining step;
   sensing a movement of the head while the head is inoperative; and
   using the damping arrangement in response to the sensing step to exert a force upon the head to thereby damp the movement, a magnitude of the force being dependent upon a parameter of the movement.

2. The method of claim 1 wherein the determining step includes detecting an absence of playback of the recording medium.

3. The method of claim 1 wherein the determining step includes determining that the head is neither reading nor writing to the recording medium.

4. The method of claim 1 wherein the activating step includes reducing an impedance of the damping arrangement.

5. The method of claim 1 wherein the sensing step includes monitoring a voltage caused by electromagnetic induction resulting from the movement of the head.

6. The method of claim 1 wherein the using step includes exerting an electromagnetic force on the head.

7. The method of claim 1 wherein the movement comprises an oscillatory movement including a plurality of local peaks, the force being exerted on the head such that the movement is damped before the head reaches an initial one of the peaks.

8. A method of controlling a head for a disk drive, comprising the steps of:
   determining that the head is in an inoperative state;
   sensing at least one of a movement of the head while the head is inoperative and a force exerted on the head while the head is inoperative; and
   exerting a damping electromagnetic force upon the head in response to the sensing step.

9. The method of claim 8 comprising the further step of activating a damping arrangement in response to the determining step, the exerting step including using the damping arrangement to exert the damping electromagnetic force.

10. The method of claim 9 wherein the activating step includes at least one of reducing an impedance of the damping arrangement and actuating a switching device.

11. The method of claim 8 wherein the sensing step includes monitoring a voltage caused by electromagnetic induction resulting from the movement of the head.

12. The method of claim 8 wherein the movement comprises a sinusoidal movement including a plurality of peaks, the force being exerted on the head such that the movement is damped before the head reaches an initial one of the peaks.

13. The method of claim 8 wherein the determining step includes detecting an absence of playback of a disk in the disk drive.

14. The method of claim 8 wherein the determining step includes determining that the head is neither reading nor writing to a disk in the disk drive and is not in a play-back mode of operation.

15. A disk drive, comprising:
   a head;
   a sensor configured to sense at least one of a movement of the head and a force exerted on the head;
   a damping apparatus coupled to the sensor and configured to exert a damping force on the head in response to a signal from the sensor; and
   a controller coupled to at least one of the sensor and the damping apparatus and configured to deactivate the at least one of the sensor and the damping apparatus when the head is in an operative state.

16. The disk drive of claim 15 wherein the sensor comprises an electromagnetic sensor configured to sense an electromagnetically-induced voltage.

17. The disk drive of claim 15 wherein the damping apparatus is configured to exert an electromagnetically-induced damping force on the head.

18. The disk drive of claim 15 wherein the controller is configured to:
   detect an event associated with the head being in the operative state; and
   deactivate the at least one of the sensor and the damping apparatus in response to the detection of the event.

19. The disk drive of claim 15 wherein the sensor includes a coil configured to carry an inductively-induced current in response to the movement of the head.

20. The disk drive of claim 15 wherein the sensor comprises a piezoresistor.

* * * * *